(12) United States Patent
Kakesu et al.

(10) Patent No.: US 12,454,978 B2
(45) Date of Patent: Oct. 28, 2025

(54) MAGNETIC BEARING APPARATUS WITH AXIAL POLE SEGMENTS

(71) Applicant: EBARA CORPORATION, Tokyo (JP)

(72) Inventors: Yu Kakesu, Tokyo (JP); Kunihiko Tanaka, Tokyo (JP); Toshimitsu Barada, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 300 days.

(21) Appl. No.: 18/321,814

(22) Filed: May 23, 2023

(65) Prior Publication Data

US 2024/0084850 A1    Mar. 14, 2024

(30) Foreign Application Priority Data

May 30, 2022  (JP) .................................. 2022-087642

(51) Int. Cl.
*F16C 32/04*  (2006.01)

(52) U.S. Cl.
CPC ...... *F16C 32/0461* (2013.01); *F16C 32/0442* (2013.01); *F16C 32/048* (2013.01); *F16C 32/0457* (2013.01); *F16C 32/047* (2013.01)

(58) Field of Classification Search
CPC .............. F16C 32/0461; F16C 32/0442; F16C 32/048; F16C 32/0457; F16C 32/047; F16C 32/0446; F16C 32/0485; F16C 37/005; F16C 32/0476; F16C 32/044; F16C 32/0474; F16C 32/0444; H02K 7/09

USPC ........................................................ 310/90.5
See application file for complete search history.

(56) References Cited

U.S. PATENT DOCUMENTS

| | | | | |
|---|---|---|---|---|
| 2003/0107282 A1* | 6/2003 | Ooyama | ............. | F16C 32/0459 310/90.5 |
| 2007/0024138 A1* | 2/2007 | Buhler | ................ | F16C 32/0468 310/90.5 |
| 2015/0362015 A1* | 12/2015 | Schulz | ................ | F16C 32/0461 310/90.5 |
| 2018/0252228 A1* | 9/2018 | Henseler | ............. | F16C 32/0465 |

FOREIGN PATENT DOCUMENTS

JP    2012-060754 A    3/2012

* cited by examiner

*Primary Examiner* — Christopher M Koehler
*Assistant Examiner* — Viswanathan Subramanian
(74) *Attorney, Agent, or Firm* — Chrisman Gallo Tochtrop LLC

(57) ABSTRACT

A magnetic bearing apparatus capable of correcting inclination of a rotating element with a small magnetic attractive force and capable of stably supporting the rotating element is disclosed. The magnetic bearing apparatus includes: a non-magnetic ring made of non-magnetic material; and at least three axial magnetic poles arranged along a circumferential direction of the non-magnetic ring. Each axial magnetic pole has an arc-shaped coil and a coil housing that accommodates the coil therein. The at least three axial magnetic poles are fixed to the non-magnetic ring.

9 Claims, 10 Drawing Sheets

MAGNETIC BEARING APPARATUS WITH AXIAL POLE SEGMENTS

CROSS REFERENCE TO RELATED APPLICATION

This document claims priority to Japanese Patent Application No. 2022-087642 filed May 30, 2022, the entire contents of which are hereby incorporated by reference.

BACKGROUND

A magnetic bearing apparatus is a device that levitates a rotating element by a magnetic force generated by an electromagnetic coil. Since the magnetic bearing apparatus can support the rotating element without mechanical contact with the rotating element, it does not cause wear or frictional heat of the rotating element. Therefore, the magnetic bearing apparatus is suitable for use in supporting a rotating element configured to rotate at a high speed, such as turbine blades of a turbomolecular pump.

FIG. 10 is a schematic diagram showing an example of a conventional magnetic bearing apparatus. As shown in FIG. 10, the magnetic bearing apparatus normally includes upper radial magnetic poles 501A, 501B and lower radial magnetic poles 502A, 502B arranged along an axis of a rotating element 500. The upper radial magnetic poles 501A, 501B and the lower radial magnetic poles 502A, 502B have a function of not only supporting a radial load of the rotating element 500, but also have a function of adjusting an inclination of the rotating element 500. Specifically, as shown in FIG. 11, when the rotating element 500 is inclined, the upper radial magnetic poles 501A and 501B and the lower radial magnetic poles 502A and 502B generate different magnetic attractive forces, so that the inclination of the rotating element 500 can be corrected.

However, when the rotating element 500 has a flat shape, large magnetic attraction forces are required to correct the inclination of the rotating element 500. Specifically, since a distance L between a center of gravity O of the rotating element 500 and a point of action of the magnetic attraction force is short, the magnetic attraction force for generating the necessary moment of force becomes large. As a result, an electric power required for the radial magnetic poles 501A, 501B, 502A, 502B increases.

Furthermore, when the rotating element 500 rotates at a high speed, the entire rotating element 500 expands radially outward. As a result, magnetic gaps between the rotating element 500 and the radial magnetic poles 501A, 501B, 502A, 502B increase, causing unstable control and a reduction in the magnetic attraction.

In addition, although not shown, the conventional axial magnetic pole has a magnetic pole core made of ring-shaped magnetic material having a U-shaped cross section, and a coil wound around the magnetic pole core. When an electric current flows through the coil, a force is generated between the magnetic pole core and a magnetic pole target arranged on the rotating element. However, when the rotating element is inclined, there exist various gaps with different magnitudes between the axial magnetic pole and the rotating element. A force generated in a gap with a small magnitude is large, while a force generated in a gap with a large magnitude is small. Such different forces cause a greater inclination of the rotating element. A heavy vertical rotating element requires a larger axial magnetic attraction force, and therefore, when such heavy vertical rotating element is inclined, the inclining force becomes even stronger, which interferes with the radial inclination control.

SUMMARY

Therefore, there is provided a magnetic bearing apparatus capable of correcting inclination of a rotating element with a small magnetic attractive force and capable of stably supporting the rotating element.

Embodiments, which will be described below, relate to a magnetic bearing apparatus capable of supporting a rotating element in a non-contact manner.

In an embodiment, there is provided a magnetic bearing apparatus for supporting a rotating element in a non-contact manner, comprising: a non-magnetic ring made of non-magnetic material; and at least three axial magnetic poles arranged along a circumferential direction of the non-magnetic ring, each axial magnetic pole having an arc-shaped coil and a coil housing that accommodates the coil therein, the at least three axial magnetic poles being fixed to the non-magnetic ring.

In an embodiment, the coil housing has an arc-shaped outer wall around which the coil is wound, an arc-shaped inner wall arranged inwardly of the outer wall, and a base plate coupled to an upper end of the outer wall and an upper end of the inner wall, and the coil housing is fixed to the non-magnetic ring.

In an embodiment, the coil housing has a flange protruding radially inwardly from the inner wall, the flange is fixed to the non-magnetic ring by fastening tools.

In an embodiment, an electric wire coupled to the coil is arranged along the flange.

In an embodiment, the non-magnetic ring has at least one recess in its inner periphery, and the electric wire extends through the recess.

In an embodiment, the coil housing has an arc-shaped inner wall around which the coil is wound, an arc-shaped outer wall arranged outwardly of the inner wall, and a base plate coupled to an upper end of the outer wall and an upper end of the inner wall, and the coil housing is fixed to the non-magnetic ring.

In an embodiment, the coil housing has a flange protruding radially outwardly from the outer wall, and the flange is fixed to the non-magnetic ring by fastening tools.

In an embodiment, an electric wire coupled to the coil is arranged along the flange.

In an embodiment, the non-magnetic ring has at least one recess in its outer periphery, and the electric wire extends through the recess.

In an embodiment, the magnetic bearing apparatus further comprises positioning pins configured to fix a relative position between the non-magnetic ring and each axial magnetic pole.

In an embodiment, the magnetic bearing apparatus further comprises molding material covering coils of the at least three axial magnetic poles.

In an embodiment, an upper surface of the coil housing is a flat surface capable of making surface contact with a heat radiating member.

According to the above embodiments, a point of action of the magnetic attraction generated by each axial magnetic pole can be away from the center of gravity of the rotating element. Therefore, the magnetic bearing apparatus can correct the inclination of the rotating element with smaller magnetic attraction. Moreover, when the rotating element rotating at a high speed expands radially outward, magnetic gaps between the axial magnetic poles and the rotating element do not change. Therefore, the magnetic bearing apparatus can stably control the posture of the rotating element.

The axial magnetic poles are secured to the single non-magnetic ring, and the relative positions of the axial magnetic poles are fixed. Therefore, even when a large load of the rotating element is applied to the axial magnetic poles, the positions of the axial magnetic poles can be stable. As a result, the axial magnetic poles can accurately control the posture of the rotating element.

DESCRIPTION OF EMBODIMENTS

Hereinafter, embodiments will be described with reference to the drawings.

Figure 1:
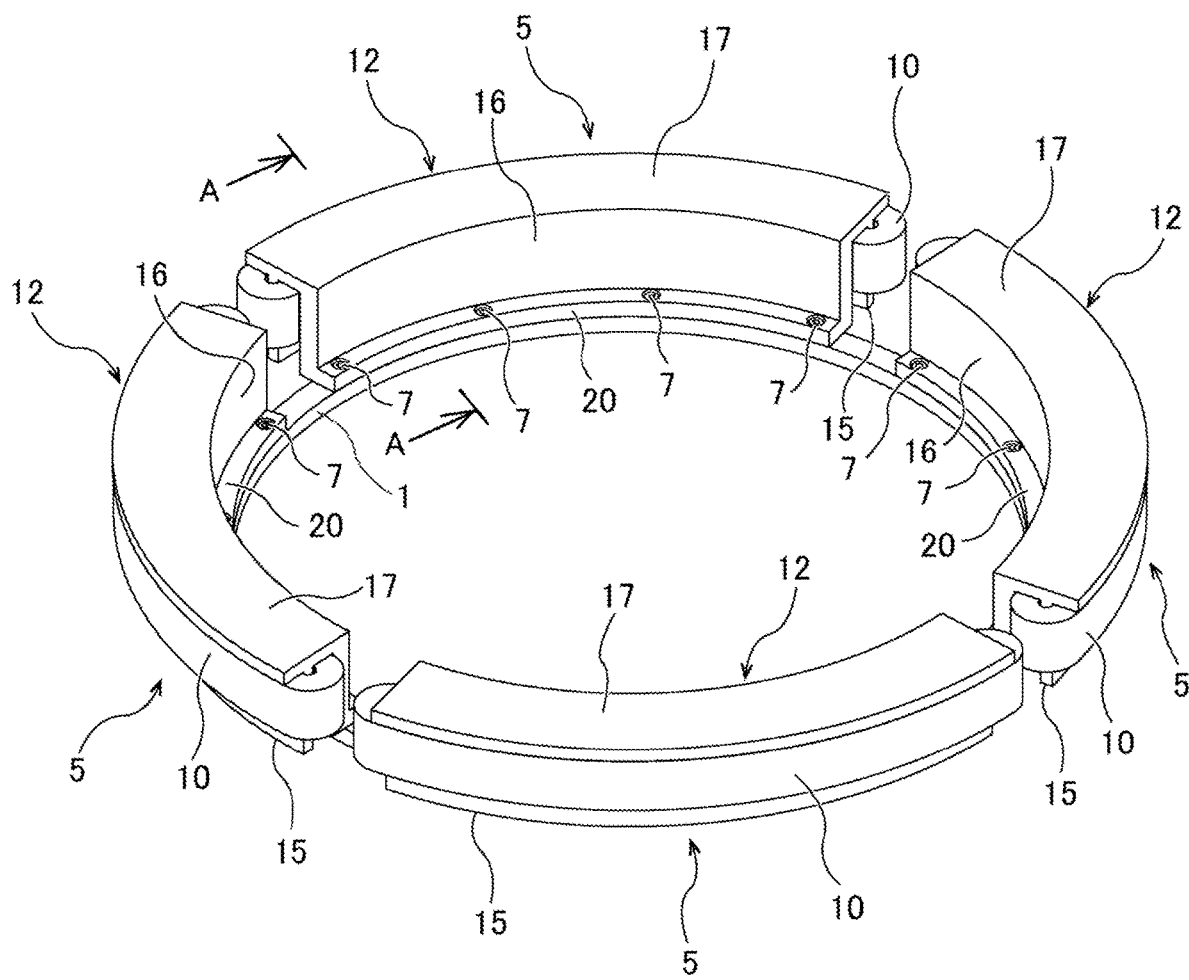
FIG. 1 is a top perspective view of an embodiment of a magnetic bearing apparatus.
Figure 2:
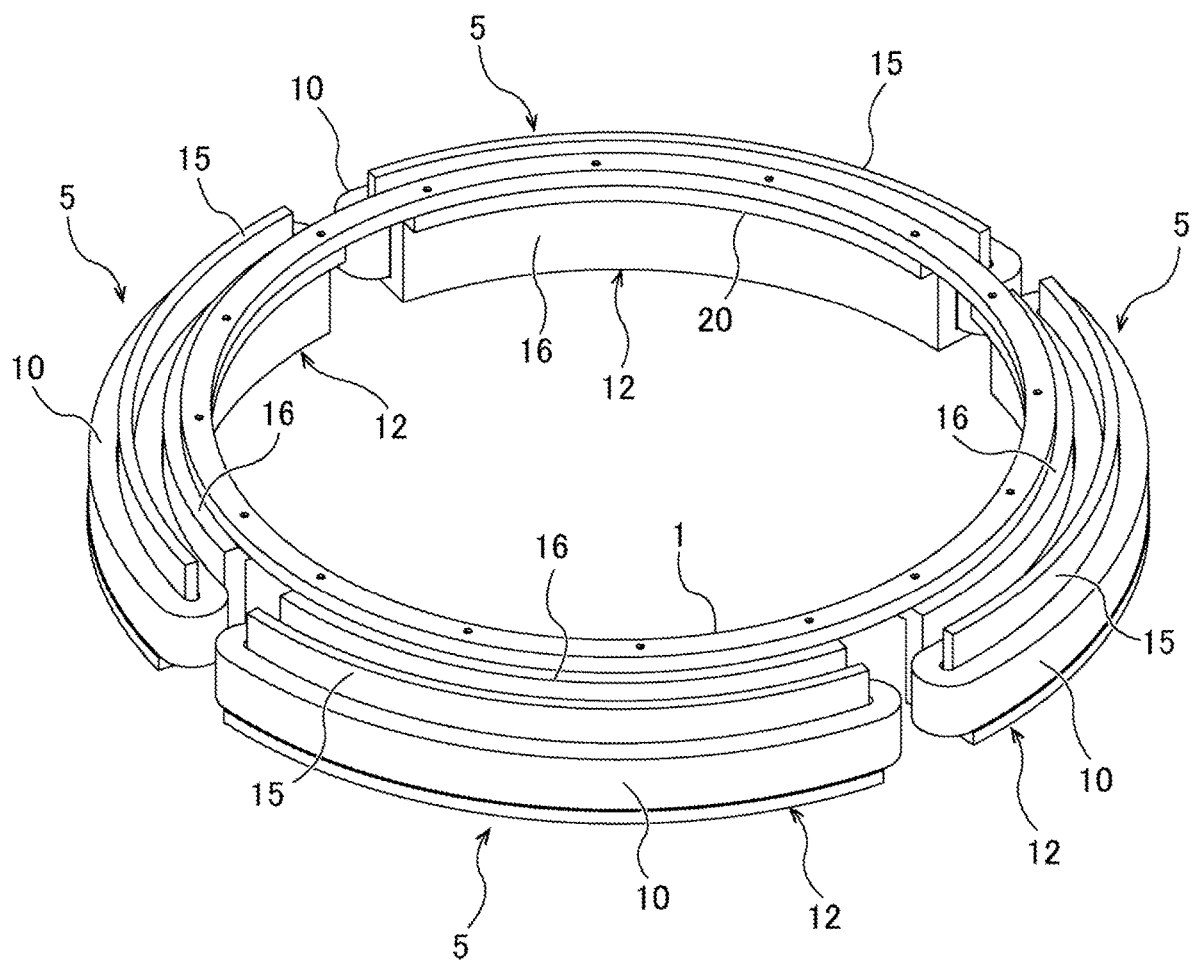
FIG. 2 is a bottom perspective view of the magnetic bearing apparatus shown in FIG. 1.

FIG. 1 is a top perspective view of an embodiment of a magnetic bearing apparatus, and FIG. 2 is a bottom perspective view of the magnetic bearing apparatus shown in FIG. 1. The magnetic bearing apparatus includes a non-magnetic ring 1 made of a non-magnetic material, and four axial magnetic poles 5 arranged along a circumferential direction of the non-magnetic ring 1. Examples of the non-magnetic material forming the non-magnetic ring 1 include austenitic stainless steel, resin-based non-magnetic materials (PTFE (polytetrafluoroethylene), fiber-reinforced plastic), and the like.

Each axial magnetic pole 5 is detachably fixed to the non-magnetic ring 1 by a plurality of screws 7 which are a plurality of fastening tools. Relative positions of these four axial magnetic poles 5 are fixed by the single non-magnetic ring 1. Each axial magnetic pole 5 has an arc-shaped coil 10 and a coil housing 12 that accommodates the coil 10. The coil housing 12 is fixed to the non-magnetic ring 1 by the plurality of screws 7 mentioned above. When the screws 7 are removed, the entire axial magnetic pole 5 can be removed from the non-magnetic ring 1.

In this embodiment, the four axial magnetic poles 5 are provided, while the number of axial magnetic poles 5 is not limited to this embodiment. At least three axial magnetic poles 5 are provided from a viewpoint of correcting an inclination of a rotating element (described later) supported by the magnetic bearing apparatus. Thus, in another embodiment, three axial magnetic poles 5 or five or more axial magnetic poles 5 may be arranged along the circumferential direction of the non-magnetic ring 1.

Each coil housing 12 has an arc-shaped outer wall 15 around which the coil 10 is wound, an arc-shaped inner wall 16 arranged inwardly of the outer wall 15, and a base plate 17 coupled to an upper end of the outer wall 15 and an upper end of the inner wall 16. A coil housing 12 is fixed to the non-magnetic ring 1. More specifically, the coil housing 12 has a flange 20 protruding radially inward from the inner wall 16. The flange 20 has an arc shape along the non-magnetic ring 1. The flange 20 has through-holes (not shown) through which the screws 7 pass, and the non-magnetic ring 1 has threaded holes (not shown) into which the screws 7 are screwed. The flange 20 is fixed to the non-magnetic ring 1 by the screws 7 screwed into the threaded holes of the non-magnetic ring 1.

The outer wall 15, the inner wall 16, and the base plate 17 are made of metal, such as iron. In this embodiment, the outer wall 15, the inner wall 16, and the base plate 17 form an integrated structure. In an embodiment, the outer wall 15, the inner wall 16, and the base plate 17 may be individual structures. The coil 10 is wound around the entire circumference of the outer wall 15, so that the outer wall 15 functions as a magnetic core for the coil 10. The inner wall 16 extends along the outer wall 15 and an inner side of the coil 10. A radial gap between the outer wall 15 and the inner wall 16 is constant. Both the outer wall 15 and the inner wall 16 are curved along the curved shape of the coil 10. The coil 10 is in contact with the base plate 17, so that heat generated in the coil 10 is transmitted to the base plate 17. The heat is released from the base plate 17 and as a result, the coil 10 can be cooled.

The four axial magnetic poles 5 are arranged along the circumferential direction of the non-magnetic ring 1 at regular intervals. The axial magnetic poles 5 are arranged with gaps therebetween. Specifically, two adjacent axial magnetic poles 5 are separated from each other so that magnetic interference between the axial magnetic poles 5 hardly occurs. The four axial magnetic poles 5 are fixed to the non-magnetic ring 1. Since the non-magnetic ring 1 is made of non-magnetic material, the magnetic interference between the axial magnetic poles 5 is unlikely to occur.

Figure 3:
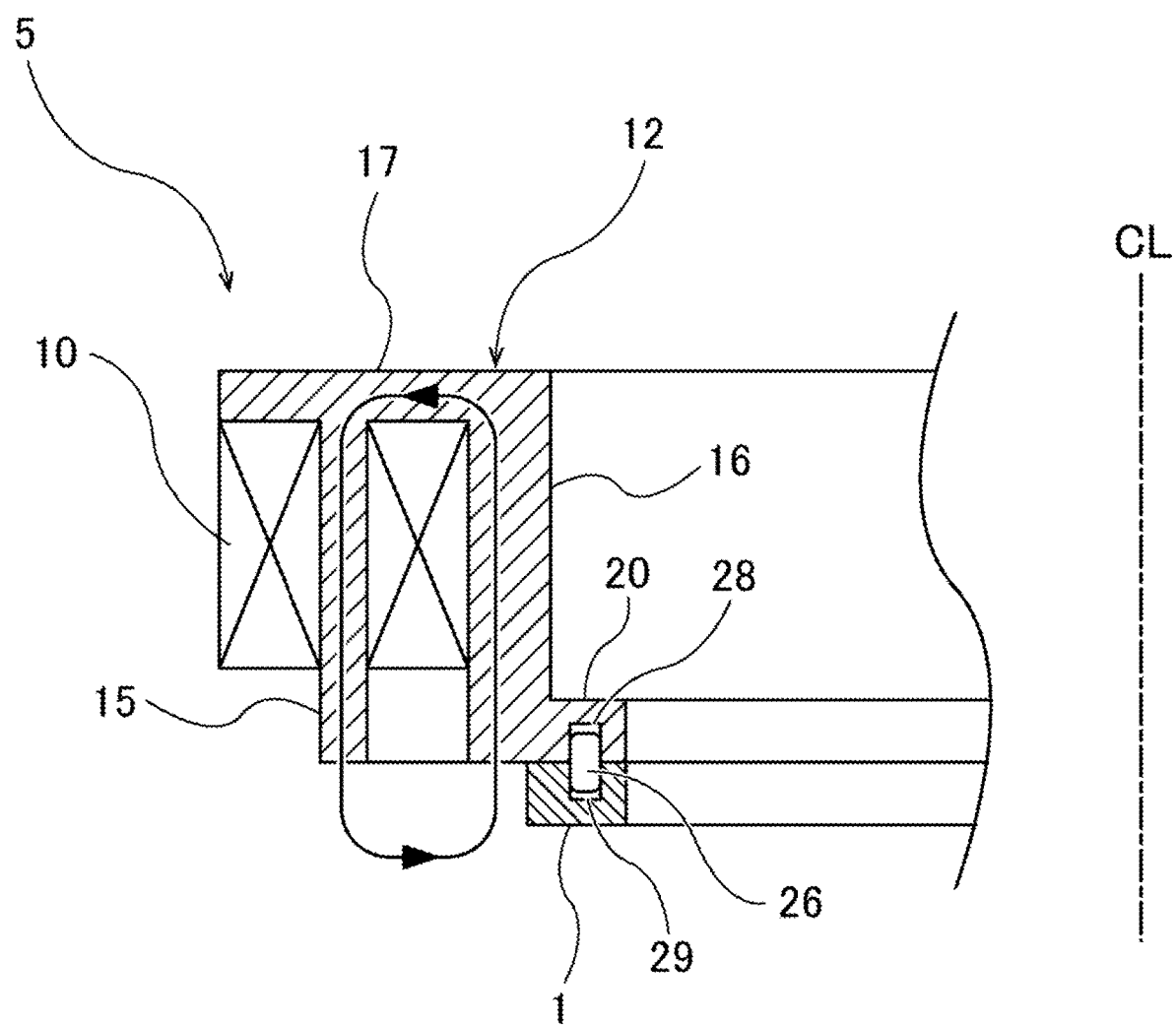
FIG. 3 is a cross-sectional view taken along line A-A of FIG. 1.

FIG. 3 is a cross-sectional view taken along line A-A of FIG. 1. As described above, the coil housing 12 includes the outer wall 15 around which the coil 10 is wound, the inner wall 16 arranged radially inwardly of the outer wall 15, and the base plate coupled to the upper end of the outer wall 15 and the upper end of the inner wall 16. 17. The outer wall 15 and the inner wall 16 are arranged in parallel and protrude downward from the base plate 17 in parallel with an axis CL of the non-magnetic ring 1. A lower end of the outer wall 15 and a lower end of the inner wall 16 are exposed downward. When the electric current is passed through the coil 10, a magnetic force is generated through the outer wall 15 and the inner wall 16. A rotating element, which will be described later, is attracted upward by the magnetic force (i.e., magnetic attraction).

The magnetic bearing apparatus further includes positioning pins 26 that fix the relative positions of the non-magnetic ring 1 and the axial magnetic poles 5. Although only one positioning pin 26 is shown in FIG. 3, multiple positioning pins 26 are provided for each axial magnetic pole 5. The coil housing 12 has first holes 28 formed in a lower surface of the flange 20. The non-magnetic ring 1 has second holes 29 formed in its upper surface. The positioning pins 26 are inserted in both the first holes 28 and the second holes 29.

The positioning pins 26 fix the relative positions of the axial magnetic poles 5 and the non-magnetic ring 1, thereby fixing relative positions of the axial magnetic poles 5 themselves as well. The axial magnetic poles 5 are fixed to the non-magnetic ring 1 by the screws 7 as fastening tools shown in FIG. 1, while the positioning pins 26 can fix the relative positions of the axial magnetic poles 5 more precisely than the screws 7. Therefore, the axial magnetic poles 5 can accurately control the posture of the rotating element which will be described later.

Figure 4:
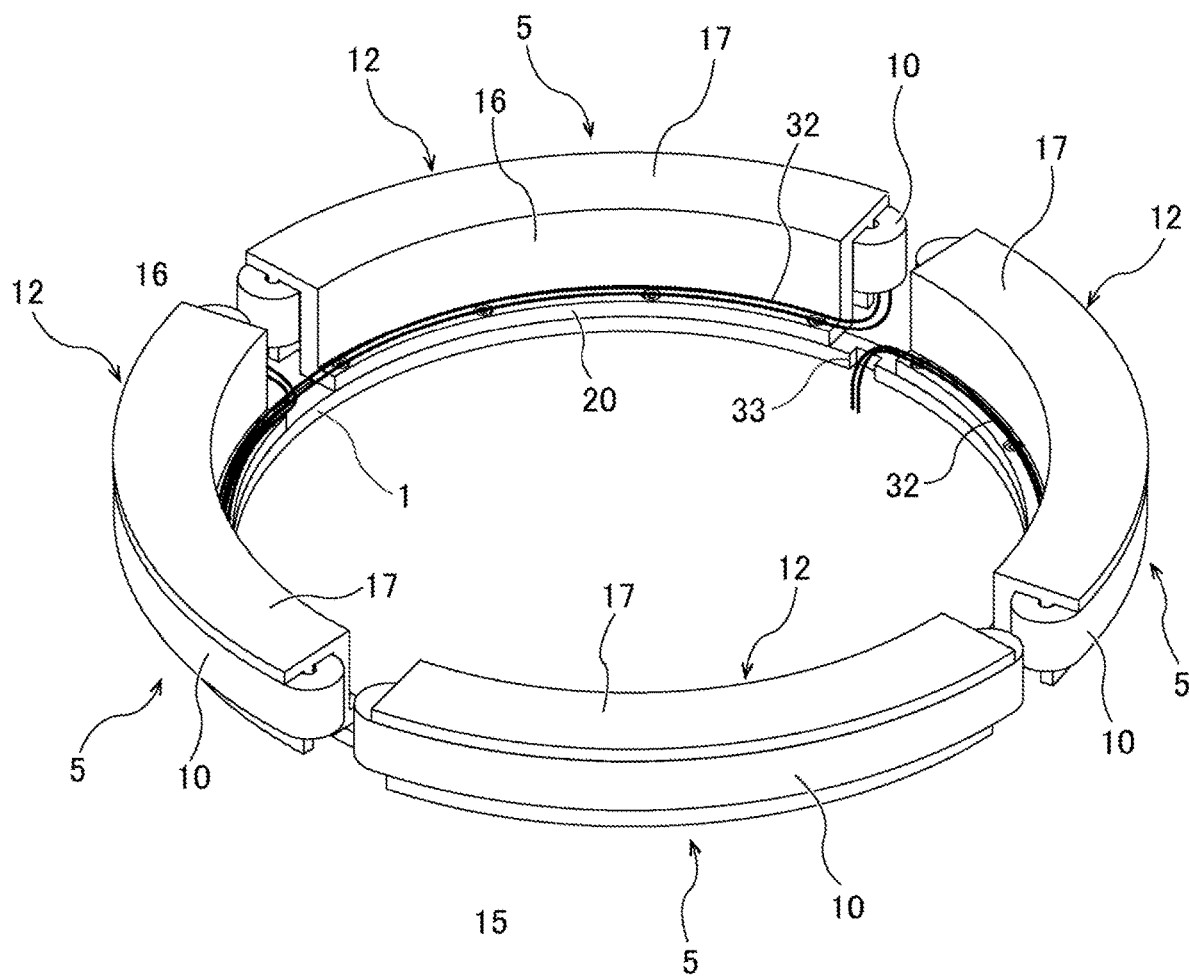
FIG. 4 is a perspective view showing an embodiment of coil wiring.

FIG. 4 is a perspective view showing an embodiment of wiring of the coils 10. As shown in FIG. 4, electric wires 32 coupled to the coils 10 are arranged along a top surface of the flange 20 of the coil housing 12. More specifically, the electric wires 32 are positioned in a space over the flange 20. According to this embodiment, there is no need to provide a dedicated space for the electric wires 32, and the configuration of the magnetic bearing apparatus can be simplified. The non-magnetic ring 1 has at least one recess 33 in its inner periphery, through which the electric wires 32 coupled to the coils 10 extend. Although one recess 33 is provided in FIG. 4, a plurality of recesses 33 may be provided.

Figure 5:
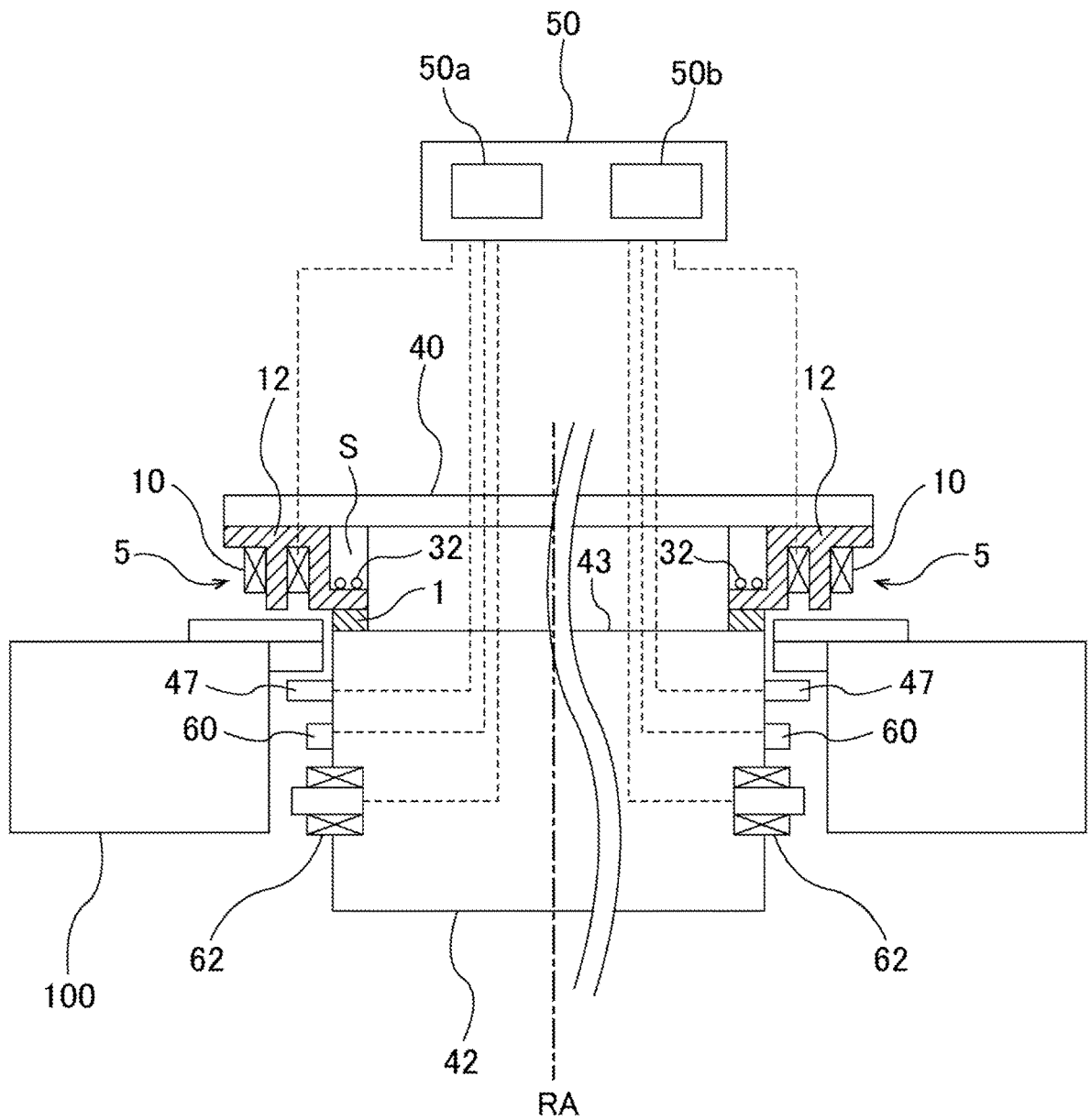
FIG. 5 is a schematic diagram showing an embodiment of a rotary machine including the magnetic bearing apparatus and a rotating element supported by the magnetic bearing apparatus.

FIG. 5 is a schematic diagram showing an embodiment of a rotary machine including the magnetic bearing apparatus described with reference to FIGS. 1 to 4 and a rotating element 100 supported by the magnetic bearing apparatus. The four axial magnetic poles 5 are arranged around an axis RA of the rotating element 100 and adjust an axial displacement of the rotating element 100 and inclination of the rotating element 100. The four axial magnetic poles 5 are located above the rotating element 100 and lift the rotating element 100 by the magnetic attraction. Axial magnetic poles 5 are not provided below the rotating element 100. The rotating element 100 is displaced downward by its own weight. Since the magnetic bearing apparatus does not have axial magnetic poles below the rotating element 100, the entire magnetic bearing apparatus can be made compact.

Specific examples of the rotating element 100 are not particularly limited, but may include, for example, turbine blades of a turbomolecular pump. The rotating element 100 of the embodiment shown in FIG. 5 is a flat rotating element having a diameter larger than its axial dimension.

The axial magnetic poles 5 and the non-magnetic ring 1 are sandwiched between a mounting cover 40 and a stepped portion 43 of a stator 42, so that the axial magnetic poles 5 and the non-magnetic ring 1 are fixed to the stator 42. Specifically, the mounting cover 40 is fixed to an upper surface of the stator 42 by screws (not shown), and the non-magnetic ring 1 fixed to the axial magnetic poles 5 is pressed against the stepped portion 43 of the stator 42 by the mounting cover 40. It should be noted, however, that mounting of the axial magnetic poles 5 and the non-magnetic ring 1 to the stator 42 is not limited to this embodiment.

The mounting cover 40 is constructed of metal, such as iron or aluminum, and is in surface contact with the coil housing 12 of each axial magnetic pole 5. More specifically, the upper surface of the coil housing 12 (i.e., the upper surface of the base plate 17) is a flat surface, which is in surface contact with the mounting cover 40 that functions as a heat radiating member. The heat generated in the coils 10 is transmitted to the mounting cover 40 via the coil housings 12, and the heat is released from the mounting cover 40, so that the coils 10 can be cooled. A space S is formed between the mounting cover 40 and the flanges 20 of the coil housings 12, and the electric wires 32 coupled to the coils 10 are arranged in the space S.

The magnetic bearing apparatus further includes a plurality of axial displacement sensors 47 configured to detect an axial displacement of the rotating element 100, and a magnetic-pole controller 50 configured to instruct the axial magnetic poles 5 based on the axial displacement of the rotating element 100 to adjust the axial position of the rotating element 100 and the inclination of the rotating element 100. The axial displacement sensors 47 are fixed to the stator 42.

The magnetic-pole controller 50 includes a memory 50a storing therein a program for controlling the position and the inclination of the rotating element 100, and an arithmetic device 50b configured to perform arithmetic operations according to instructions included in the program. The magnetic-pole controller 50 is composed of at least one computer. The memory 50a includes a main memory, such as a random access memory (RAM), and an auxiliary memory, such as a hard disk drive (HDD) or solid state drive (SSD). Examples of the arithmetic device 50b include a CPU (central processing unit) and a GPU (graphic processing unit). However, the specific configurations of the magnetic-pole controller 50 are not limited to these examples.

The axial displacement sensors 47 and the axial magnetic poles 5 are electrically coupled to the magnetic-pole controller 50. The axial position of the rotating element 100 and the inclination of the rotating element 100 can be determined from measured values of the axial displacement of the rotating element 100 sent from the axial displacement sensors 47 to the magnetic-pole controller 50. Therefore, the magnetic-pole controller 50 instructs the axial magnetic poles 5 based on the measured values of the axial displacement of the rotating element 100 to maintain a target axial position and a target inclination (including a vertical posture) of the rotating element 100.

According to the embodiments, the posture (including the inclination) of the rotating element 100 can be corrected (or adjusted) by the magnetic attractions generated by the axial magnetic poles 5. As can be seen from FIG. 5, a point of action of the magnetic attraction generated by each axial magnetic pole 5 can be away from the center of gravity of the rotating element 100. Therefore, the magnetic bearing apparatus can correct the inclination of the rotating element 100 with smaller magnetic attractions. Further, when the rotating element 100 rotating at a high speed expands radially outward, magnetic gaps between the axial magnetic poles 5 and the rotating element 100 do not change. Therefore, the magnetic bearing apparatus can stably control the posture of the rotating element 100.

The magnetic bearing apparatus further includes radial displacement sensors 60 configured to detect a radial displacement of the rotating element 100, and radial magnetic poles 62 configured to support the radial load of the rotating element 100. The radial displacement sensors 60 and the radial magnetic poles 62 are fixed to the stator 42. The radial displacement sensors 60 are electrically coupled to the magnetic-pole controller 50. The radial position of the rotating element 100 can be determined from measured values of the radial displacement of the rotating element 100 sent from the radial displacement sensors 60 to the magnetic-pole controller 50. Therefore, the magnetic-pole controller 50 instructs the radial magnetic poles 62 based on the measured values of the radial displacement of the rotating element 100 to maintain a target radial position of the rotating element 100.

Since the axial magnetic poles 5 are arranged around the axis RA of the rotating element 100, the magnetic-pole controller 50 can be configured to instruct the axial magnetic poles 5 to adjust not only the axial position of the rotating element 100, but also the radial position of the rotating element 100. In this case, the radial displacement sensors 60 and the radial magnetic poles 62 may be omitted.

Figure 6:
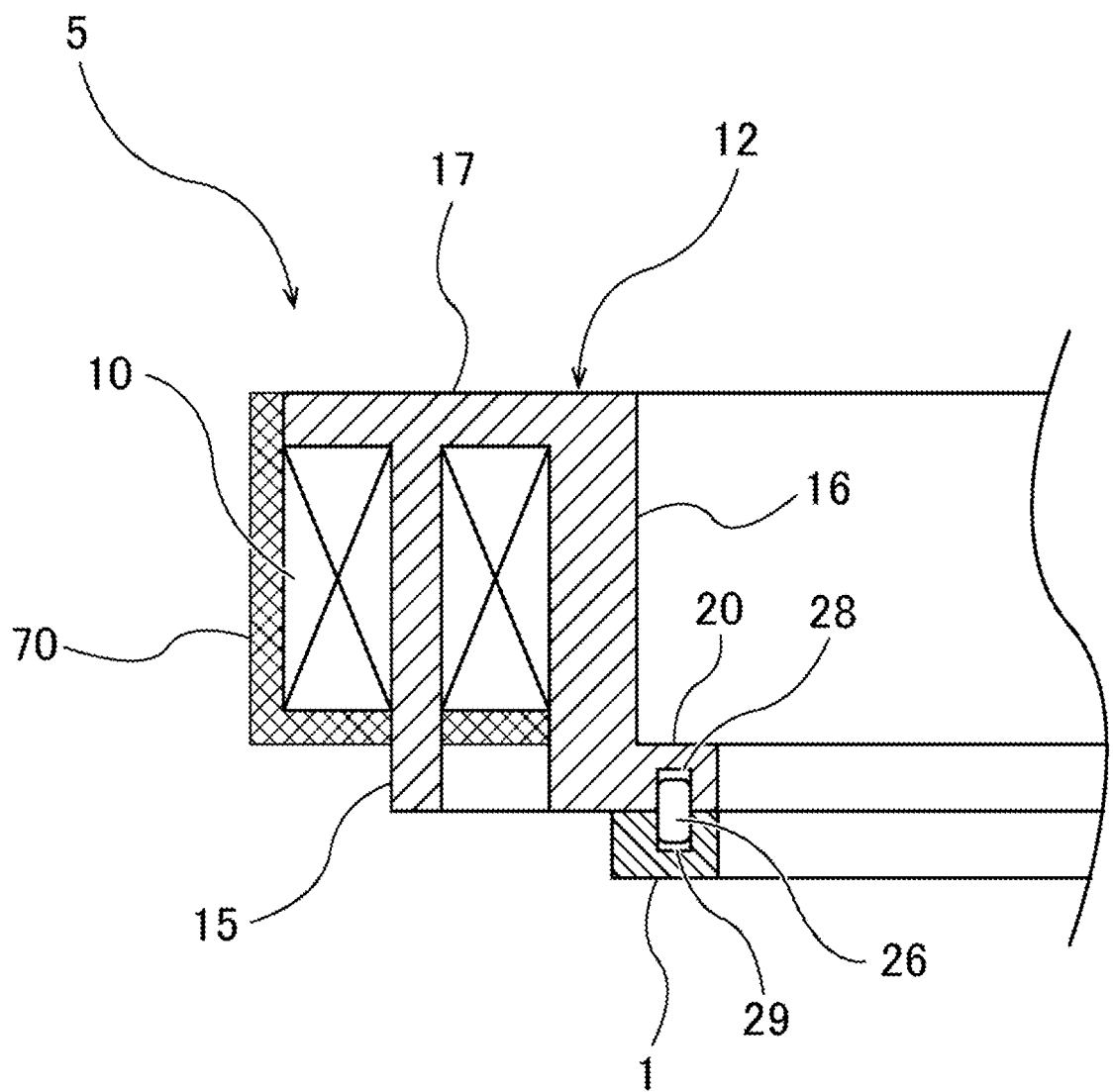
FIG. 6 is a cross-sectional view showing another embodiment of the magnetic bearing apparatus.

FIG. 6 is a cross-sectional view of another embodiment of the magnetic bearing apparatus. Configurations and operations of this embodiment, which will not be particularly described, are the same as those of the embodiments described with reference to FIGS. 1 to 5, and their repetitive descriptions will be omitted. As shown in FIG. 6, the magnetic bearing apparatus includes a molding material 70 covering the coil 10 of each axial magnetic pole 5. Specific examples of the molding material 70 include epoxy resin. The molding material 70 has functions of fixing the coil 10, insulating and protecting the coil 10, protecting the coil 10 from a corrosive gas and radicals, and removing heat from the coil 10.

The molding material 70 not only covers the coils 10 of the four axial magnetic poles 5, but also fills the gaps between the axial magnetic poles 5. The molding material 70 can increase the mechanical strength of the four axial magnetic poles 5 whose relative positions are fixed by the non-magnetic ring 1.

Figure 7:
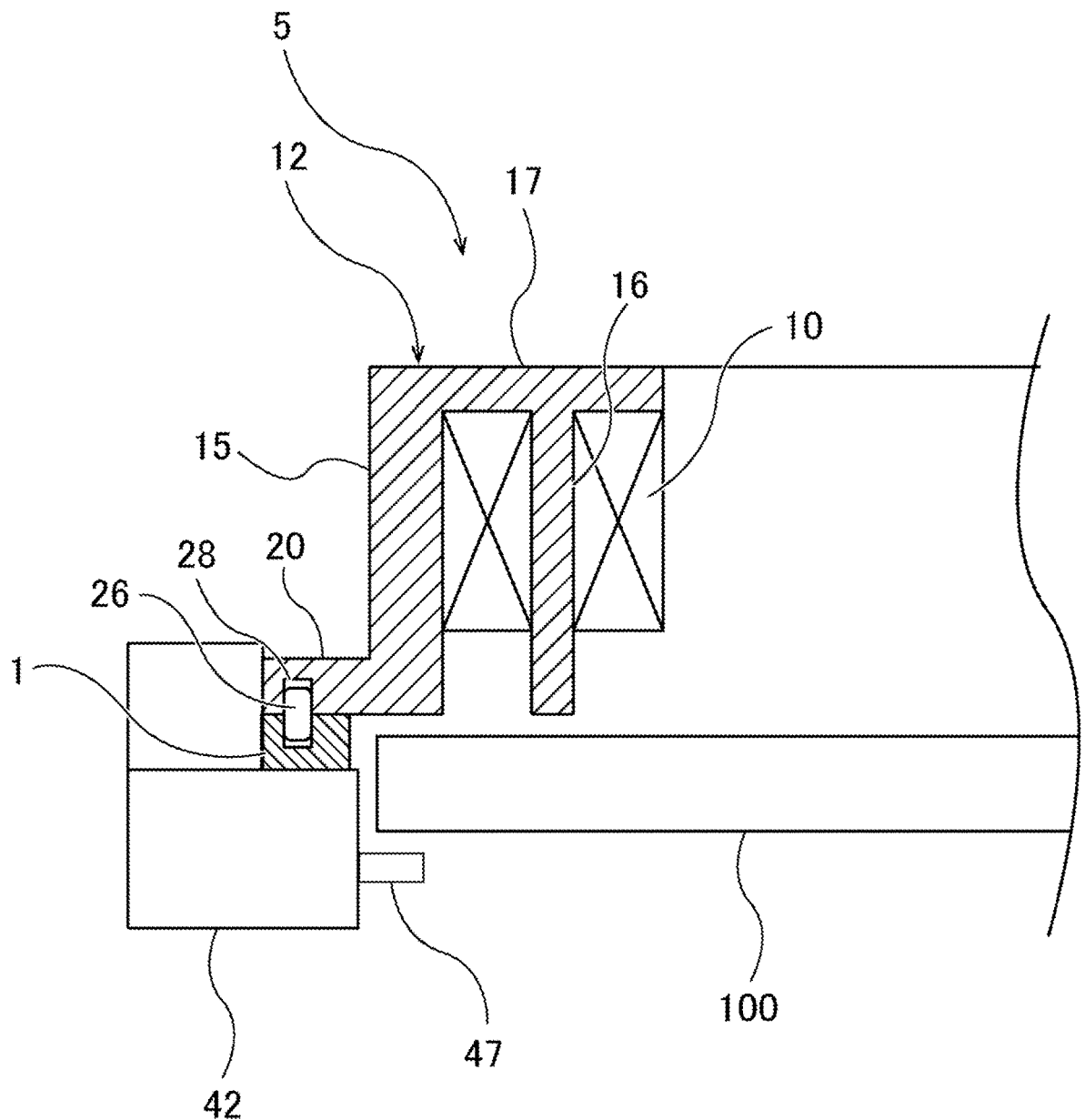
FIG. 7 is a cross-sectional view showing still another embodiment of the magnetic bearing apparatus.

FIG. 7 is a cross-sectional view showing yet another embodiment of the magnetic bearing apparatus. Configurations and operations of this embodiment, which will not be particularly described, are the same as those of the embodiments described with reference to FIGS. 1 to 5, and their repetitive descriptions will be omitted. As shown in FIG. 7, each coil housing 12 has an arc-shaped inner wall 16 around which the coil 10 is wound, an arc-shaped outer wall 15 disposed outwardly of the inner wall 16, and a base plate 17 coupled to an upper end of the outer wall 15 and an upper end of the inner wall 16. The coil housing 12 is fixed to the non-magnetic ring 1.

A stator 42 has a hollow shape having an internal space, and the rotating element 100 is arranged in the internal space of the stator 42. Specifically, the stator 42 is arranged so as to surround the rotating element 100. Each coil housing 12 has a flange 20 protruding radially outwardly from the outer wall 15. The flange 20 is fixed to the non-magnetic ring 1 by fastening tools, such as screws (not shown). The non-magnetic ring 1 is fixed to the stator 42 by fastening tools, such as screws (not shown). Therefore, the axial magnetic poles 5 fixed to the non-magnetic ring 1 are fixed to the stator 42.

Figure 8:
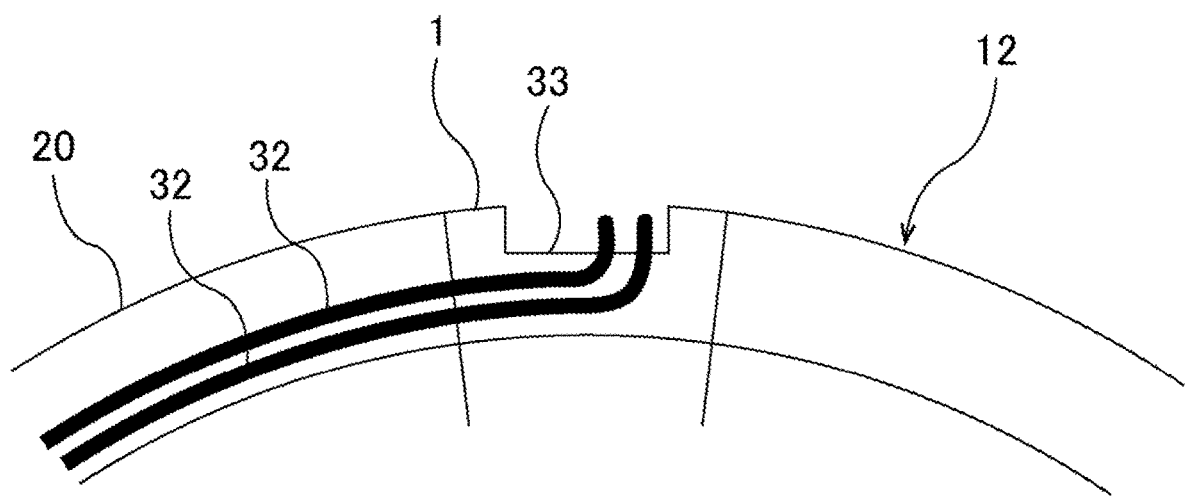
FIG. 8 is a top view of a coil housing of FIG. 7 as viewed from above.

FIG. 8 is a top view of the coil housing 12 of FIG. 7 as viewed from above. As shown in FIG. 8, the electric wires 32 coupled to the coils 10 are arranged along the top surface of the flange 20. The non-magnetic ring 1 has at least one recess 33 in its outer periphery, through which the electric wires 32 coupled to the coils 10 extend. Although one recess 33 is provided in FIG. 8, a plurality of recesses 33 may be provided.

Figure 9:
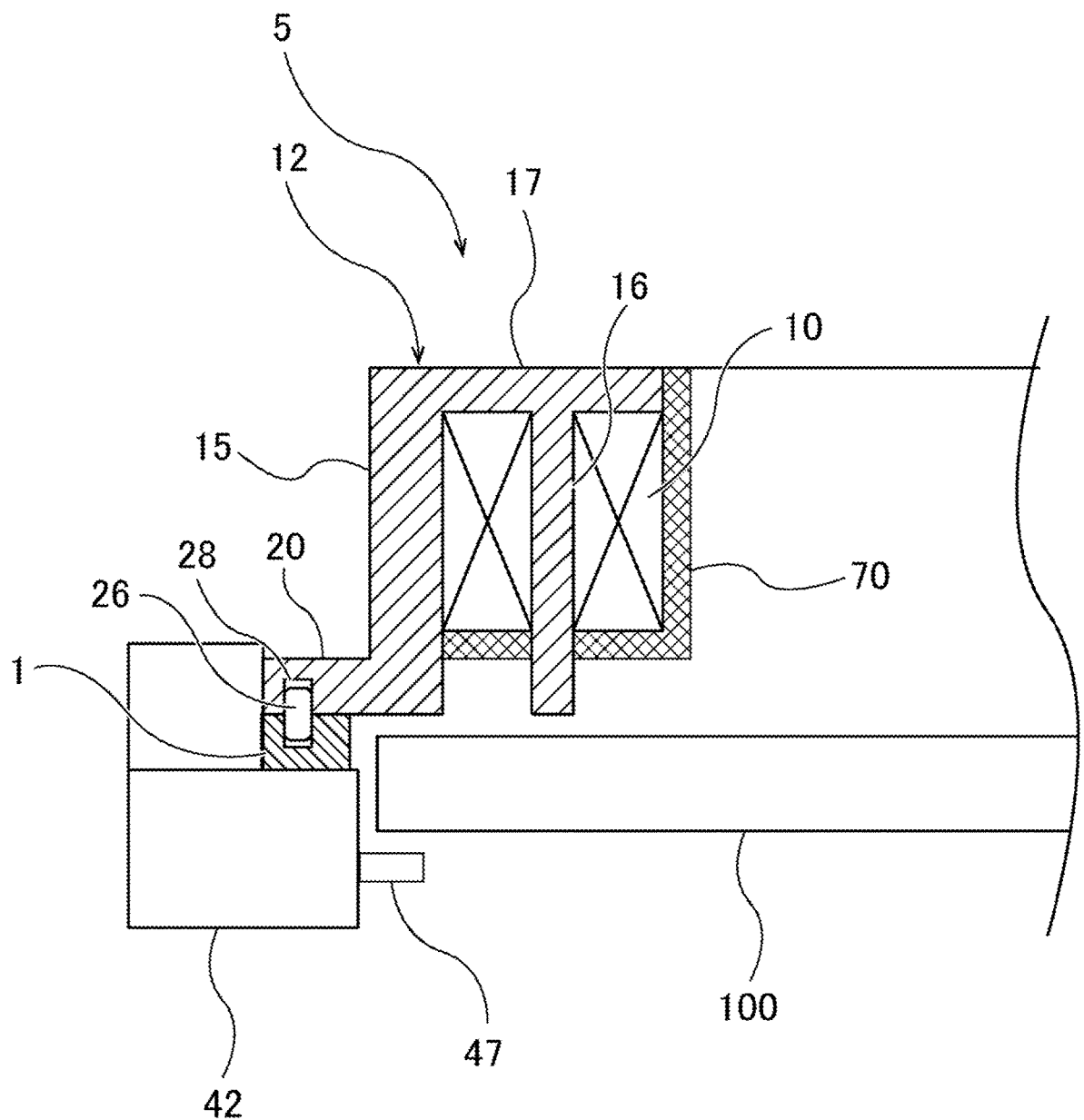
FIG. 9 is a cross-sectional view showing still another embodiment of the magnetic bearing apparatus.
Figure 10:
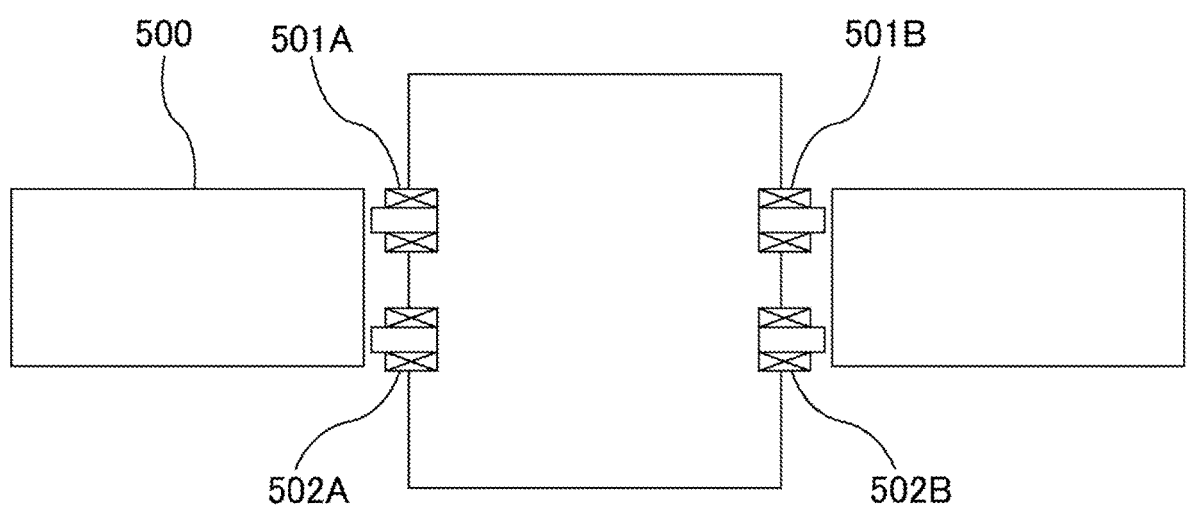
FIG. 10 is a schematic diagram showing an example of a conventional magnetic bearing apparatus.
Figure 11:
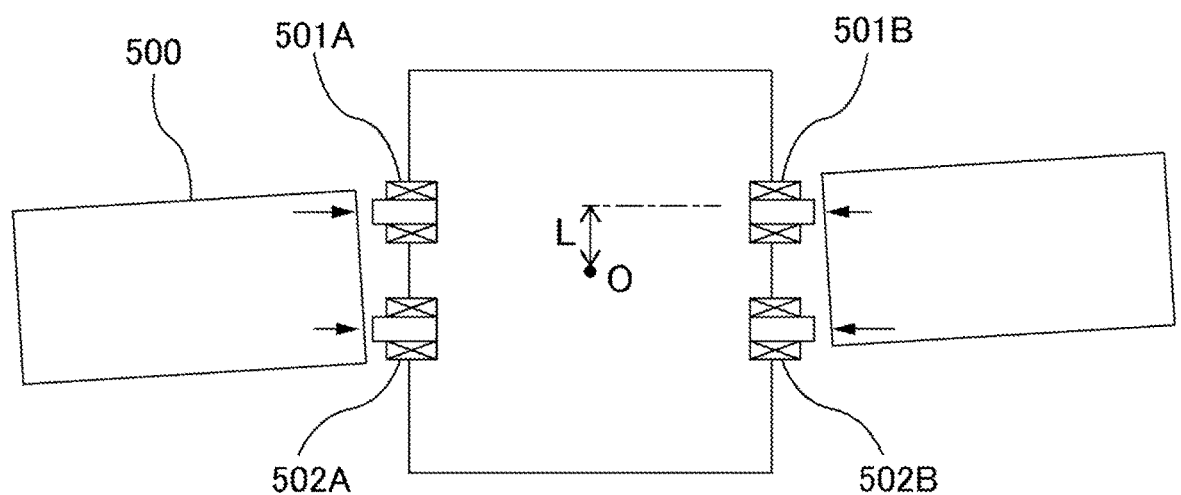
FIG. 11 is a diagram for explaining how the conventional magnetic bearing apparatus corrects an inclination of a rotating element.

As shown in FIG. 9, the molding material 70 shown in FIG. 6 is applicable to the embodiment shown in FIG. 7.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

What is claimed is:

1. A magnetic bearing apparatus for supporting a rotating element in a non-contact manner, comprising:
   a non-magnetic ring made of non-magnetic material; and
   at least three axial magnetic poles arranged along a circumferential direction of the non-magnetic ring, the at least three axial magnetic poles having a plurality of arc-shaped coils and a plurality of coil housings that accommodate the plurality of coils therein, respectively, the at least three axial magnetic poles being fixed to the non-magnetic ring,
   wherein the plurality of coil housings have a plurality of arc-shaped outer walls around which the plurality of arc-shaped coils are wound, respectively, and a plurality of arc-shaped inner walls arranged radially inwardly of the plurality of arc-shaped outer walls, respectively, and
   wherein the plurality of arc-shaped inner walls are separated from each other, and gaps are formed between the plurality of arc-shaped inner walls,
   wherein the plurality of coil housings have a plurality of arc-shaped base plates coupled to the plurality of arc-shaped outer walls and the plurality of arc-shaped inner walls,
   wherein the plurality of arc-shaped base plates are separated from each other, and gaps are formed between the plurality of arc-shaped base plates, and
   wherein the plurality of coil housings are fixed to the non-magnetic ring,
   wherein the plurality of coil housings have a plurality of flanges protruding radially inwardly from the plurality of arc-shaped inner walls, the plurality of flanges are fixed to the non-magnetic ring, the plurality of flanges are separated from each other, and gaps are formed between the plurality of flanges.

2. The magnetic bearing apparatus according to claim 1, wherein electric wires are coupled to the plurality of coils and are arranged along the plurality of flanges.

3. The magnetic bearing apparatus according to claim 2, wherein the non-magnetic ring has at least one recess in its inner periphery, and the electric wires extend through the recess.

4. The magnetic bearing apparatus according to claim 1, further comprising positioning pins configured to fix a relative position between the non-magnetic ring and each axial magnetic pole.

5. The magnetic bearing apparatus of claim 1, further comprising molding material covering coils of the at least three axial magnetic poles.

6. The magnetic bearing apparatus according to claim 1, wherein an upper surface of each coil housing is a flat surface capable of making surface contact with a heat radiating member.

7. A magnetic bearing apparatus for supporting a rotating element in a non-contact manner, comprising:
   a non-magnetic ring made of non-magnetic material; and
   at least three axial magnetic poles arranged along a circumferential direction of the non-magnetic ring, the at least three axial magnetic poles having a plurality of arc-shaped coils and a plurality of coil housings configured to accommodate the plurality of coils therein, respectively, the at least three axial magnetic poles being fixed to the non-magnetic ring,
   wherein the plurality of coil housings have a plurality of arc-shaped inner walls around which the plurality of arc-shaped coils are wound, respectively, and a plurality of arc-shaped outer walls arranged radially outwardly of the arc-shaped inner walls, respectively, wherein the plurality of arc-shaped outer walls are separated from each other and gaps are formed between the plurality of arc-shaped outer walls, and wherein the plurality of coil housings are fixed to the non-magnetic ring, wherein the plurality of coil housings have a plurality of flanges protruding radially outwardly from the plurality of arc-shaped outer walls, the plurality of flanges are fixed to the non-magnetic ring, the plurality of flanges are separated from each other, and gaps are formed between the plurality of flanges.

8. The magnetic bearing apparatus according to claim 7, wherein electric wires are coupled to the plurality of coils and are arranged along the plurality of flanges.

9. The magnetic bearing apparatus of claim 8, wherein the non-magnetic ring has at least one recess in its outer periphery, and the electric wires extend through the recess.

* * * * *